United States Patent [19]
Thornton

[11] Patent Number: 4,463,886
[45] Date of Patent: Aug. 7, 1984

[54] CLEAVING TOOL FOR OPTICAL FIBERS
[75] Inventor: Leif N. Thornton, Hanover, Mass.
[73] Assignee: Augat Inc., Mansfield, Mass.
[21] Appl. No.: 367,461
[22] Filed: Apr. 12, 1982
[51] Int. Cl.³ .............................................. C03B 37/16
[52] U.S. Cl. ........................................ 225/96.5; 225/2
[58] Field of Search .................... 225/2, 96, 96.5, 101, 225/103, 93

[56]  References Cited
U.S. PATENT DOCUMENTS

| 3,934,773 | 1/1976 | Chinnock et al. | 225/2 |
| 4,118,862 | 10/1978 | Hensel | 30/124 |
| 4,168,026 | 9/1979 | Lukas et al. | 225/96.5 |
| 4,257,546 | 3/1981 | Benasutti | 225/96.5 |
| 4,274,572 | 6/1981 | Dunn et al. | 225/96.5 |
| 4,322,025 | 3/1982 | Johnson | 225/96.5 |

Primary Examiner—Frank T. Yost
Attorney, Agent, or Firm—Weingarten, Schurgin, Gagnebin & Hayes

[57]  ABSTRACT

A tool is provided for the cleaving or separation of optical fibers so as to provide a flat perpendicular end face for the fiber. In the cleaving process, fiber is inserted into a slot and extends between an opposing scribe and anvil positioned at the end of the slot. In order to cleave the fiber, the fiber is first moved in a direction towards the scribe which, when it touches the fiber, produces a mark or surface imperfection on the outer surface of the fiber or its cladding. After scribing, the fiber is moved in an opposite direction over the anvil at which point the fiber is broken at the scribe mark. In one embodiment means are provided to press the fiber over the anvil for more precise cleaving.

7 Claims, 21 Drawing Figures

CLEAVING TOOL FOR OPTICAL FIBERS

FIELD OF THE INVENTION

This invention relates to optical fibers and more particularly to a method and apparatus for severing or cleaving optical fibers or like brittle filaments or stands.

BACKGROUND OF THE INVENTION

As exemplified by the optical fiber cleaving tool of Thomas and Betts Corporation of Raritan, New Jersey, termination tool model DW9000, of the Deutsch Optical Waveguide, the fiber breaking machine Model CS-2 of Custom Scientific Instruments, Inc., Whippany, N.J. and the splicing instrument for optical fibers and cable of Sumitomo Electric Ind. of Tokyo, Japan various systems for the cleaving or separation of optical fibers have been provided in which the fibers are held stationary, with one or more parts being moved into contact with the fiber to effect a scribe and break-type operation.

As described in a paper entitled, Optical Fiber End Preparation for Low-Loss Splices, by D. Gloge et al, Bell System Technical Journal, vol. 52, pp. 1579-1588, conventional grinding and polishing techniques turn out to be time consuming and costly when trying to provide simple and inexpensive splicing techniques for cables made from brittle materials like glass. As described in this article, it is the purpose of these techniques to provide flat and perpendicular end faces for the fibers. It is thus necessary to provide absolute control of the breaking process in order to obtain utmost reliability for splices made by scoring and then breaking the optical fiber. While the above-mentioned tools have provided for the cleaving of optical fibers, in general these devices have involved multiple parts which are moved to the fiber in order to provide for the scribing and breaking functions.

It should be noted that it has been well documented that glass rods tend to break in such a way that the fracture face comprises three regions known as the mirror, the mist, and the hackle zones. The mirror zone is an optically smooth surface adjacent of the fracture origin, the hackle zone corresponds to an area where the fracture has forked and the specimen is separated into three or more pieces, and the mist zone is a transition region between these two zones. As will be appreciated, the hackle zone may be manifested in the form of a lip or a breakaway to the side of the fiber opposite the scribed portion.

It is the purpose of any optical fiber splicing tool to provide a cleaved fiber in which the cleavage plane is perpendicular to the longitudinal axis of the fiber and in which the surface is optically flat or mirrored. Improperly cleaved fibers will either have an oblique cleavage plane or will have either a lip or a breakaway at the side of the fiber opposite the scribe point.

As is conventional, fibers are provided with a cladding layer and it is the cladding layer which is usually scribed as opposed to the inner core or fiber. While lips or breakaways of the cladding layer present little difficulty in terms of transmission characteristics, if the lip or breakway extends into the core, significant transmission losses occur. Moreover, in the case of a lip, the presence of a lip prevents close spacing of end-to-end mated fibers which affects transmission between coupled fibers.

SUMMARY OF THE INVENTION

In the subject invention an exceedingly simple fiber optic cleaving tool is provided which permits the severing and breaking of an optical fiber in such a manner that the cleavage plane is perpendicular to the longitudinal axis of the fiber and in which lips and breakaways are minimized. The subject fiber optic cleaving tool in one embodiment has no moving parts. In this embodiment, a fiber retaining channel or groove is provided in a hold-down block and the fiber to be cleaved is inserted into this channel, with the free end extending therefrom. It is the purpose of this groove to tether one portion of the fiber from which point the free end may pivot or be tensioned. A scribing device in the form of a knife edge is located to one side of the channel centerline at one end of the channel, whereas an anvil having an outwardly curved face is located on a diametrically opposite side of the centerline.

To cleave the fiber, the fiber is first moved manually by its free end in one direction so that a portion of the fiber is pressed against the scribe. This portion is then brought down over the anvil by moving the free end in the opposite direction to break the fiber at the scribe point. In this manner, a simple manipulation of the free end of the fiber first towards the scribe and then away from it causes the fiber to break over the curved surface of the anvil in a clean, efficient manner. It will be appreciated that in this embodiment the fiber optic cleaving tool has no part which is moved towards the fiber either for scribing or for breaking. Moreover, the tool is extrememly simple to utilize, is lightweight and extremely portable. The fiber optic cleaving tool may be held in one hand while grasping the end of the fiber in the other hand, thus eliminating the necessity of a flat work space or table.

In another embodiment, the fiber optic cleaving tool is provided with a telescope which swings out of the way during the cleaving operation but which is swung into place to permit viewing the end of the fiber for ascertaining the quality of the break.

In a further embodiment, the optical fiber cleaving tool may be utilized to cleave a fiber extending from a standard fiber optic connector. In this case a connector-holding fixture is positioned adjacent the opposing scribe and anvil and is spaced from the nose of the connector such that the optical fiber protrudes between the scribe and the anvil. The fiber is then cleaved as described above. In this case the nose of the connector provides the same function as the fiber retaining groove. The scribe and anvil combination may be positioned a predetermined distance from the nose of the connector so as to permit the breaking off of the fiber a predetermined distance from this end. After cleavage and inspection, the fiber may be withdrawn into the connector either flush with the nose or may be recessed into the nose of the connector a predetermined amount depending on the use to which the optical fiber connector is to be put.

While a tool with no moving parts is exceedingly simple and may be manipulated easily to provide good quality fiber end termination, in a further embodiment apparatus is provided which is actuated to press the scribed fiber against the anvil while maintaining those portions of the fiber to either side of the anvil parallel to the original direction of the fiber, e.g. parallel to the tangent to the anvils curved surface at the point directly opposite the scribe mark on the fiber. This ensures that the forces applied in breaking the fiber across the anvil are equally distributed fore and aft of the scribe mark so that the break provides a cleavage plane which is perpendicular to the longitudinal axis of the fiber. In order to accomplish this, in one embodiment pairs of pins are provided to either side of the anvil. The pins are mounted on a bifurcated lever with two pins on each of the bifurcated legs. In one embodiment, the pins have a conical upper portion and a cylindrical lower portion. The lever is provided with a hinge point such that when actuated the pins come up to the fiber, at which point the tips of the pins contact the fiber to the side of the fiber opposite that of the anvil. As the lever continues in its actuation the pins are moved up even further causing the fiber to be pushed towards the anvil by virtue of the taper of the pins. With the lever fully depressed, the pins are moved even further in an upward direction such that the cylindrical portions of the pins contact the fiber to press the fiber against the anvil.

The inner pins serve to press the fiber against the anvil, whereas the outer pins in combination with the inner pins serve to align the portions of the fiber to either side of the anvil in a direction parallel to the aforementioned tangent. The object of the pins is to ensure that the tension applied to the fiber is applied in a direction parallel to the aforementioned tangent so that balanced forces are applied at the scribe line. The pin furthest from the groove is utilized as a stop about which the fiber is pulled to provide for the break. The utilization of the outermost pin prevents pulling which would result in unbalanced forces being applied at the scribe line. If the fiber were not pulled around the outermost pin, unequal forces could be applied at the scribe point. This would result in either the formation of an oblique cleavage plane at the end of the fiber or would result in either a lip or a breakaway.

In terms of scribing, the scribe is in general triangular shaped and is usually made of sapphire. When the fiber is pulled against the scribe, a minute cut is made in the cladding material of the fiber. It should be noted that the shallower the cut, the more perfect will be the resulting end termination of the fiber. Thus, only slight pressure against the scribe is necessary and, in fact, it is possible to cleave the fiber by only touching the edge of the scribe although at least one sawing action is usually preferred. In order to ensure a proper scribe mark, a block is provided with a radiused edge spaced from the scribe. When scribing, the fiber is pulled against this edge which provides one point of a two point suspension, the other point being the cutting edge of the scribe. If sawing action is required, by gently pulling the fiber around the edge and raising and lowering the fiber along the vertical rising portion of the edge, the fiber moves vertically upwardly and downwardly against the scribe blade in a sawing action. Note that the edge provides for a predetermined angle during scribing, which angle may be readily preset.

BRIEF DESCRIPTION OF THE DRAWINGS

These and other features of the subject invention will be better understood in connection with the detailed description taken in conjunction with the drawings of which.

DETAILED DESCRIPTION OF THE DRAWINGS

Figures 1, 6A, 6B:
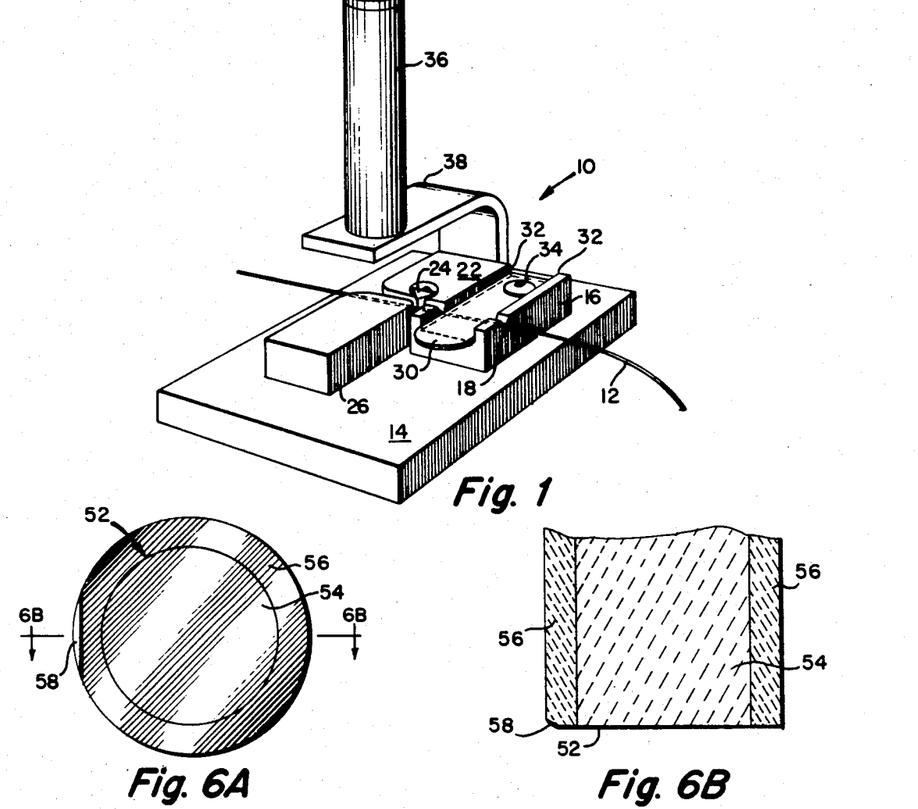
FIG. 1 is a perspective view of one embodiment of the subject optical fiber cleaving tool.
FIG. 6A is an end view of a properly cleaved optical fiber.
FIG. 6B is a cross-sectional view of the optical fiber of FIG. 6A.

Referring now to FIG. 1, an optical fiber cleaving tool 10 is utilized to properly cleave or break an optical fiber 12 such that the end of the cleaved fiber is flat and lies in a plane perpendicular to the longitudinal axis of the fiber. While the subject device will be described in connection with optical fibers, it will be appreciated that the subject invention relates not only to the cleaving of optical fibers but also to the cleaving of any brittle, frangible or breakable strand which is cleavable by scribing and breaking.

In one embodiment, the tool of the subject invention is a hand-held tool which has a base 14 and a strand retaining block 16 which has a groove 18 running through the top surface thereof. The fiber is inserted into this groove from right to left such that a free portion 20 of the fiber extends from the tool as illustrated. The groove has a center line which defines the longitudinal axis of the fiber to be cleaved. The fiber exits block 16 at its leftmost end and a scribe block 22 having a scribe 24 housed therein is positioned to one side of the extension of the groove centerline. An anvil 26 having an outwardly curved or convex surface 28 is disposed on the base diametrically opposite to the scribe, e.g., to the other side of the centerline extension.

Fiber retaining block 16 includes a spring-loaded fiber retaining tab 30 located in a groove 32 at the top surface of block 16, with tab 30 being secured at one end via a retaining bolt 34 or like means.

In one embodiment, the tool is provided with a telescope 36 mounted on a swingable arm 38 which is hinged to base 14 as will be described in FIG. 5. The telescope is shown swung out of the way of the fiber so that the fiber may be appropriately cleaved.

Figure 2:
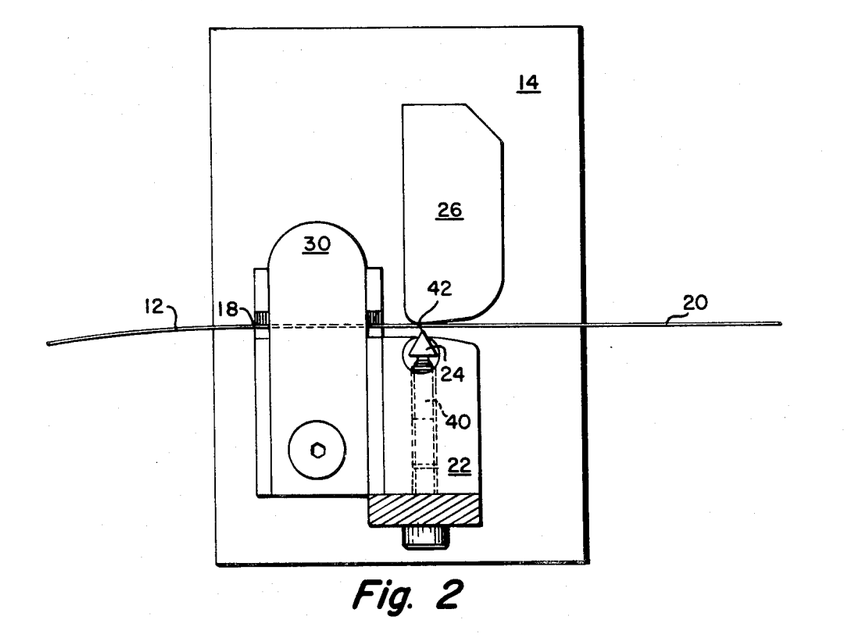
FIG. 2 is a top view of the fiber optical cleaving tool of FIG. 1 illustrating the insertion of an optical fiber into a retaining groove.

Referring now to FIG. 2, fiber 12 is shown inserted into groove 18 underneath tab 30 such that it projects through the space between scribe 24 and anvil 26. In this drawing it will be seen that scribe 24 is mounted in a cylindrical cut in block 22 and is maintained in place by a set screw 40 which projects through the block. In this embodiment, scribe 24 is triangular in cross-section and is elongated to define a vertically running edge 42.

Figure 3:
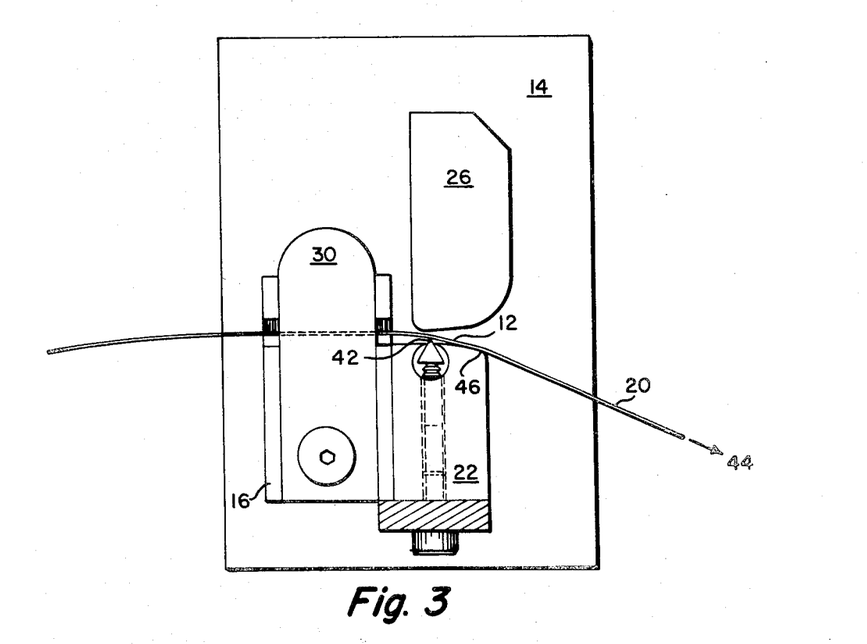
FIG. 3 is a top view of the optical fiber cleaving tool of FIG. 1 illustrating scribing of the optical fiber.

Referring to FIG. 3, in operation, free fiber portion 20 is bent downwardly as illustrated such that fiber 12 comes into contact with edge 42 of the scribe. In general, to make contact with this edge the fiber is pulled in the direction of arrow 44 so as to tension fiber 12 onto edge 42. This is ordered by the contact of fiber 12 with radiused edge 46 of block 22 such that there is a two point suspension of fiber 12 between edge 42 and edge 46.

Oftentimes it is only necessary to nick the cladding of fiber by the above-mentioned pulling operation. However, it may be desirable to increase the size of the scribe mark by moving fiber portion 20 vertically up and down so as to provide a sawing motion of edge 42 against fiber 12. It has been found, however, that the quality of the separation is determined by the size of the scribe line in that the smaller the size of the scribe line, the higher will be the quality of the fiber end when cleaved.

Figure 4:
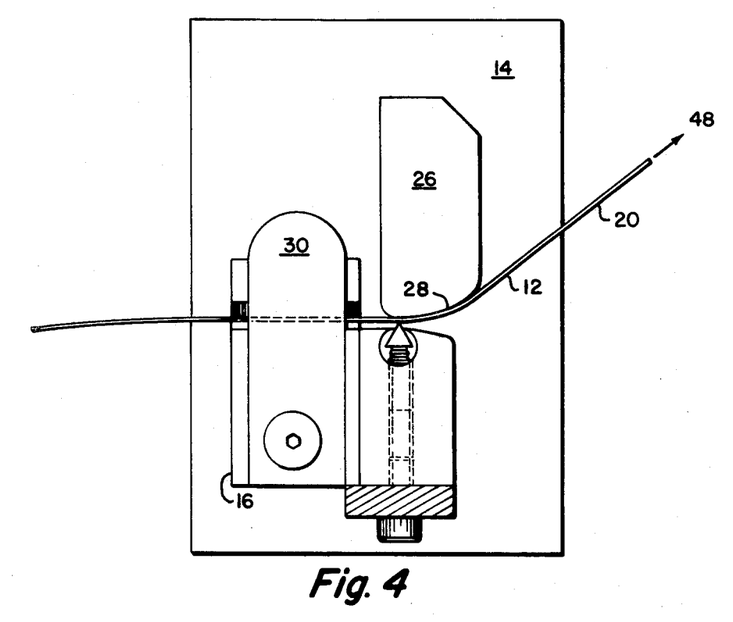
FIG. 4 is a top view of the optical fiber cleaving tool of FIG. 1 illustrating the pulling of the scribed fiber of FIG. 3 over an anvil.

Referring now to FIG. 4, after scribing, fiber portion 20 is moved in the direction illustrated and is pulled in the direction of arrow 48 so that fiber 12 is tensioned over curved surface 28 of anvil 26 whereupon the fiber is broken at the scribe line.

Figure 5:
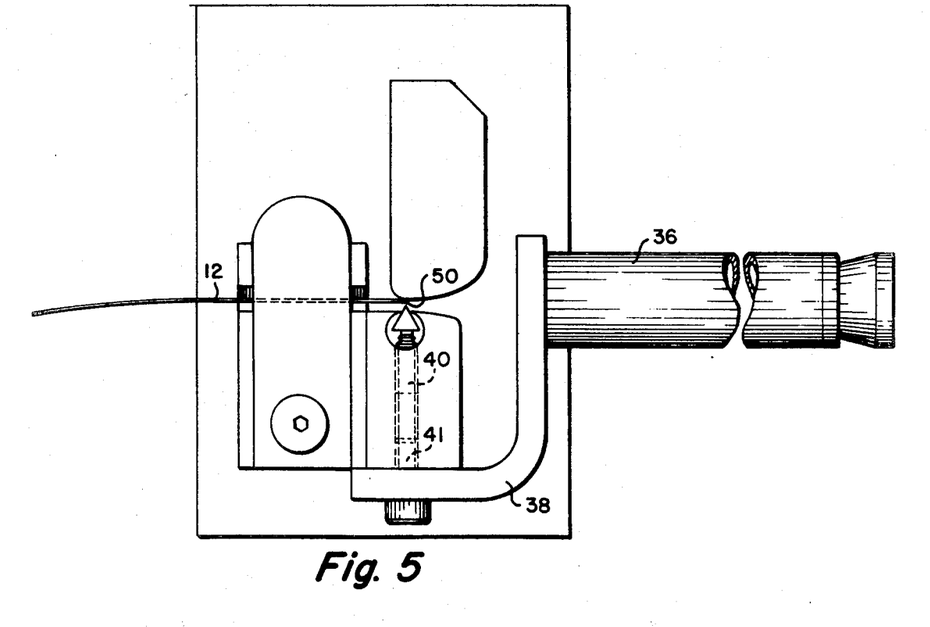
FIG. 5 is a top view of the optical fiber cleaving tool of FIG. 1 illustrating the positioning of a telescope to view the cleaved end of an optical fiber.

Thereafter, and referring now to FIG. 5, the cleaved end 50 of fiber 12 may be inspected by swinging telescope 36 downwardly about a pivot provided by shoulder screw 41 such that arm 38 may be pivoted to the position shown. This permits an end-on viewing of the quality of the cleaved fiber end, which visual inspection is useful prior to utilizing the cleaved fiber in a fiber optic connector.

Referring to FIG. 6A, an appropriately cleaved fiber will have a mirror finish face 52 which encompasses core 54 and cladding 56. As can be seen, the scribe line as illustrated at 58 nicks only a very small portion of the cladding and results, as illustrated in FIG. 6B in a planner face, with scribe line 58 to the left. This can be clearly seen through the utilization of telescope 36.

Figure 7A:
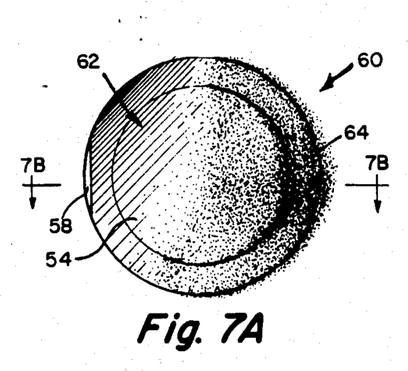
FIG. 7A is an end view of an improperly cleaved optical fiber.
Figure 7B:
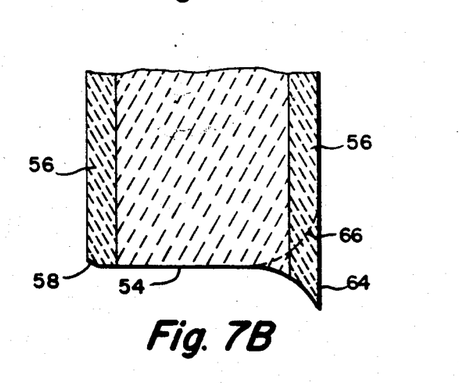
FIG. 7B is a cross-sectional view of the optical fiber of FIG. 7A.

Referring to FIG. 7A, should the fiber be improperly cleaved, there will be a portion 60 which is either misted or out-of-focus as compared with a portion 62 which is either mirror-smooth or in-dash focus. Portion 60 will be due either to the formation of a lip 64 as illustrated in FIG. 7B, or a breakaway portion illustrated by dotted line 66. If any portion viewed fiber end is either misted or out-of-focus in the region of core 54, it means that either the cleavage plane is non-orthogonal to the longitudinal axis of the fiber or that either a lip or a breakaway has been formed. In any of the three above cases, transmission losses will occur when this cleaved fiber is to be coupled to another fiber. Additionally, in the case of a lip, it will be impossible to achieve a minimum fiber-to-fiber separation when two fibers are to be coupled together.

Figure 8:
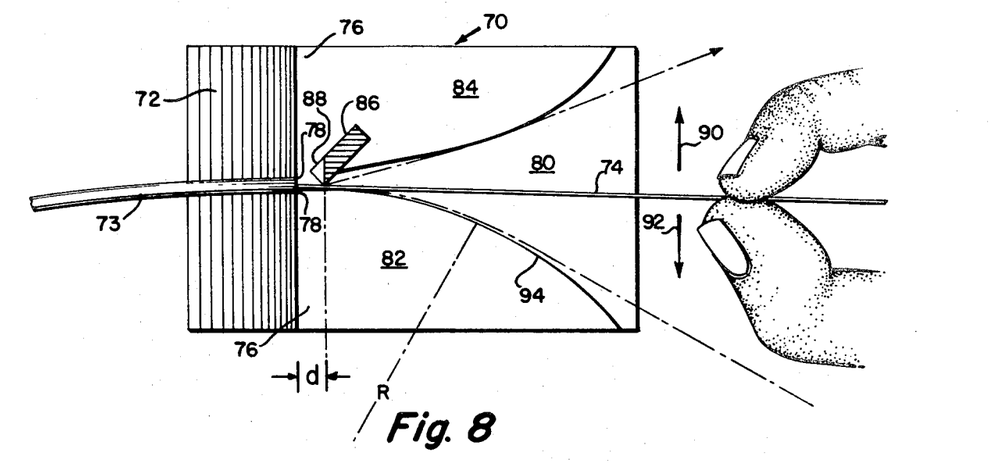
FIG. 8 is a top view of a further embodiment of the subject optical fiber cleaving tool illustrating a unitary construction.

Referring now to FIG. 8, a unitary optical fiber cleaving tool 70 which utilizes the aforementioned principles may be formed in plastic. Tool 70 may have a recessed ridged portion 72 as illustrated. A portion of the covering 73 of an optical fiber has been stripped back as illustrated so as to leave an optical fiber, either clad or unclad, as illustrated at 74. Tool 70 includes a built-up portion 76 which forms a stop at 78. The built-up portion 76 has a shaped central depressed channel 80 which forms an anvil 82 and a housing 84 for scribe 86 which is positioned in a channel 88 so as to protrude into channel 80. The operation of this unitary tool is the same as that described in connection with FIGS. 1 through 7 in that fiber 74 is first moved in the direction of arrow 90 for scribing and then in the direction of arrow 92 for cleaving over curved surface 94 of anvil portion 82. In a preferred embodiment, the curved surface 94 is radiused as indicated by R. Note the fiber is cleaved a predetermined distance "d" from the point at which the fiber covering meets stop 78.

Figure 9:
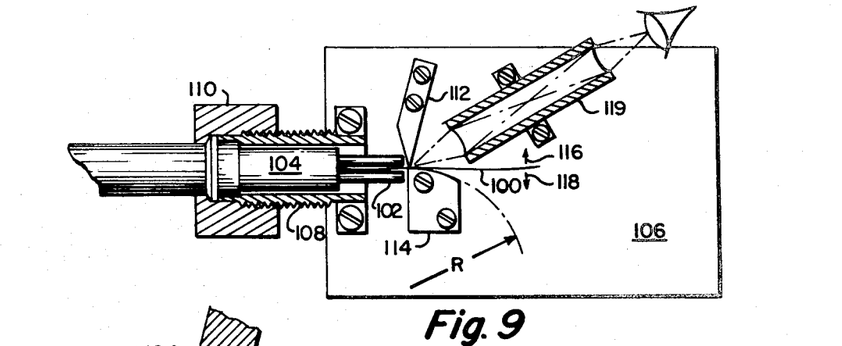
FIG. 9 is a diagrammatic illustration of fiber optical cleaving tool for cleaving fibers which have been inserted into a fiber optic connector.

Referring to FIG. 9, an optical fiber 100 may be cut off at the nose 102 of a fiber optic connector 104 through which it has been inserted. In this case, a base 106 is provided with a screw mount fixture 108 to which fiber optic connector 104 is secured by nut 110. As can be seen, fiber 100 extends between scribe 112 and anvil 114. For breaking of the fiber at the appropriate point, fiber 100 is moved in the direction of arrows 116 and 118, respectively, so as to cleave the fiber predetermined distance from nose 102. The result of the cleaving operation can be viewed by telescope 119.

Figure 10:
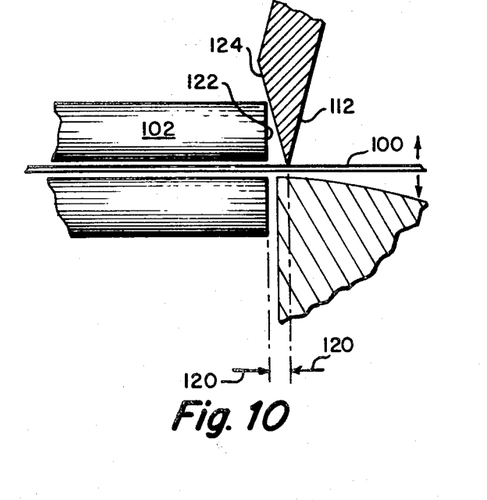
FIG. 10 is a detailed view of the cleaving of an optical fiber which extends from the connector of FIG. 9.

Referring to FIG. 10, this predetermined distance is illustrated by arrows 120 with the predetermined distance being determined by the position of scribe 112. The cutoff spacing can be determined in one embodiment by positioning nose 102 such that its upper end 122 lies against a face 124 of scribe 112.

Figure 11:
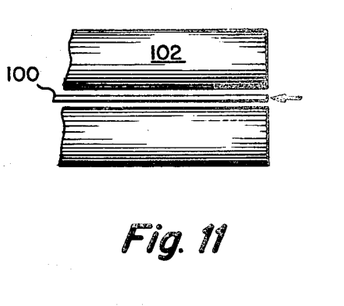
FIG. 11 is a diagrammatic representation of the withdrawal of the cleaved optical fiber into the nose portion of the connector of FIG. 9.

Referring to FIG. 11, fiber 100 may be withdrawn within nose 102 such that it is flush with the nose thereby to complete the assembly of the fiber optic connector.

In the above embodiments, it will be appreciated that the mere pulling down of the fiber against the radiused anvil will cause the breaking of the fiber at the scribe line. In general, it is not necessary to pull to any great degree along the longitudinal axis of the fiber in order to achieve a clean break.

Figure 12:
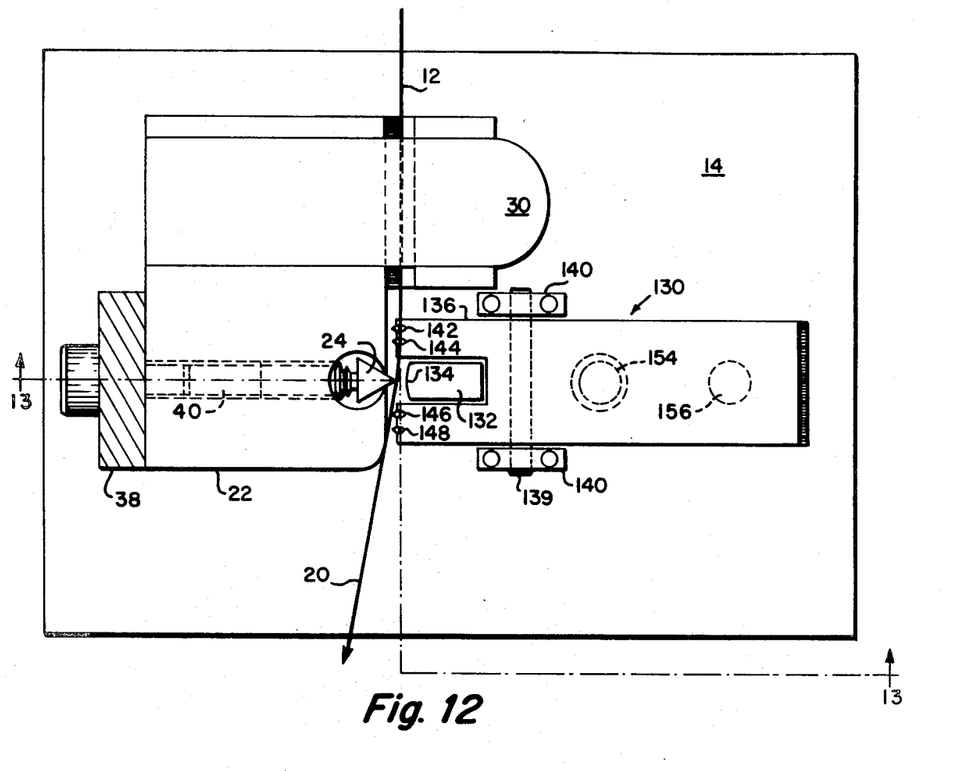
FIG. 12 is a top view of an additional embodiment of the subject optical fiber cleaving tool illustrating lever actuated means for pressing the scribed optical fiber to an anvil while maintaining equal forces to either side of the scribe line of the optical fiber.

Referring now to FIG. 12, the optical fiber cleaving tool of FIG. 1 may be provided with a lever-actuated fiber pressing tool 130 in which anvil 26 of FIG.1 has been replaced with a smaller anvil 132 which is radiused at its front edge 134. The lever actuated tool includes a lever bifurcated at 136 and 138 to surround anvil 132 and is pivoted about a pivot pin 139 mounted to blocks 140 which are in turn mounted to base 14.

Figure 13:
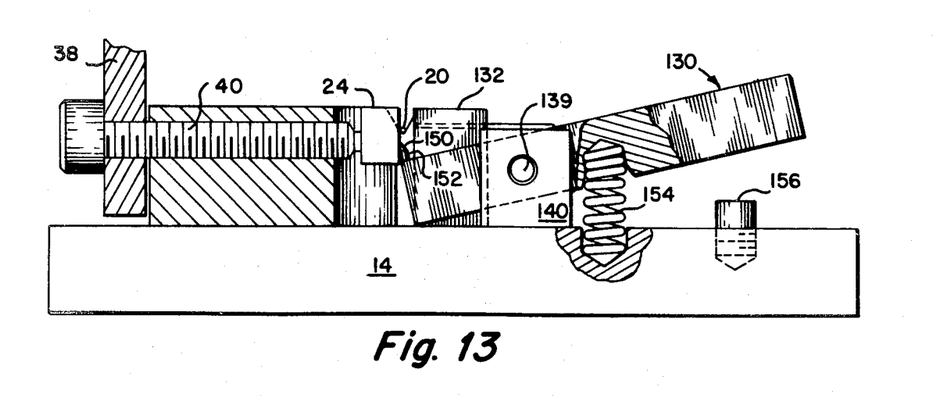
FIG. 13 is a side and cross-sectional view of the optical fiber cleaving tool of FIG. 12 showing the lever in its unactuated position and illustrating the position of the pins thereof relative to the optical fiber.
Figure 14:
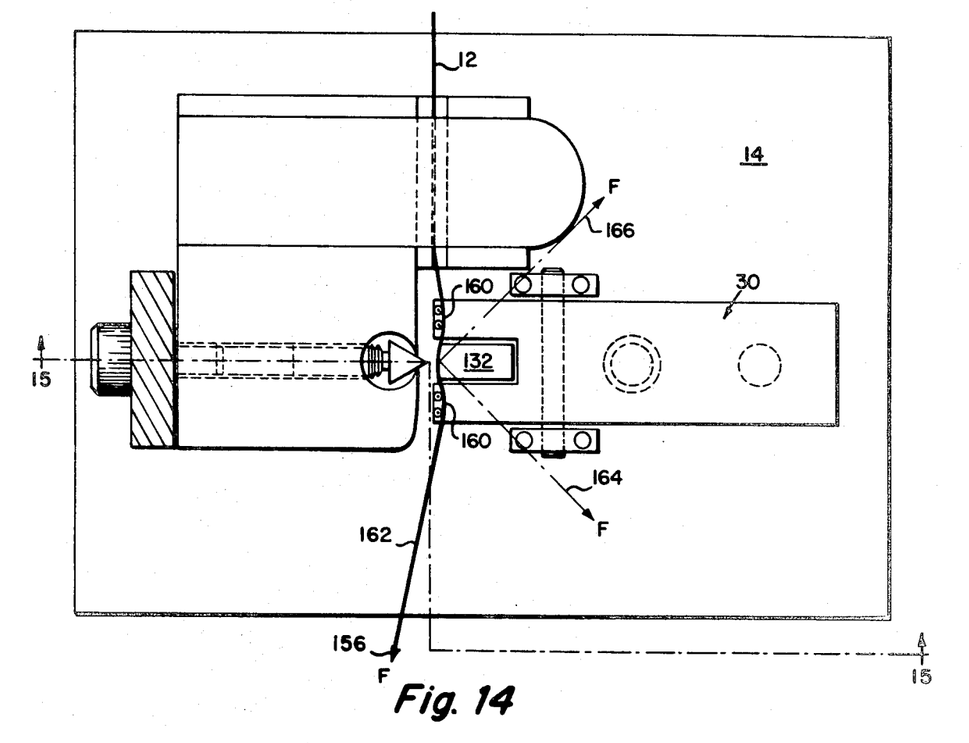
FIG. 14 is a top view of the optical fiber cleaving tool of FIG. 12 with the lever depressed and the optical fiber pressed against the anvil of the tool.

Pairs of pins 142, 144, 146 and 148 are mounted respectively to bifurcated portions 136 and 138. These pins, in a preferred embodiment, have a conically tapered upper portion and a straight cylindrical lower portion as illustrated at 150 and 152, respectively, in FIG. 13. Note that lever 130 is biased by a spring 154. In the unactuated position, the lever provides that the pins are out of the way for the scribing operation which is the same as that described hereinbefore. When first actuated the lever moves the pins upwardly such that the points of the tapered pins lie to the side of fiber 20 opposite that of anvil 132. As the lever is further depressed, the fiber contacts the widening portion of the taper and is thus driven towards the anvil. When lever 130 is depressed so as to contact stop 156 and referring now to FIG. 14, the fiber is engaged by the cylindrical portions of the pins so as to pull the fiber to the right where it is pressed against the radiused face 134 of anvil 132. The fiber is then pulled in the direction of arrow 156 such that the fiber is tensioned over the anvil and is broken at the scribe line. It will be appreciated that by utilizing the two pairs of pins, portions of the fiber 160 to either side of the anvil are maintained parallel to the tangent to radiused surface 134 opposite the scribe line. It is the purpose of the pins to provide that as long as fiber end 162 is pulled downwardly and to the left equal forces illustrated by arrows 164 and 166 provide that the fiber will break in such a way that the cleaved end will be perpendicular to the longitudinal axis of the fiber. This also ensures that the break will be free of lips or breakaways.

Figure 15:
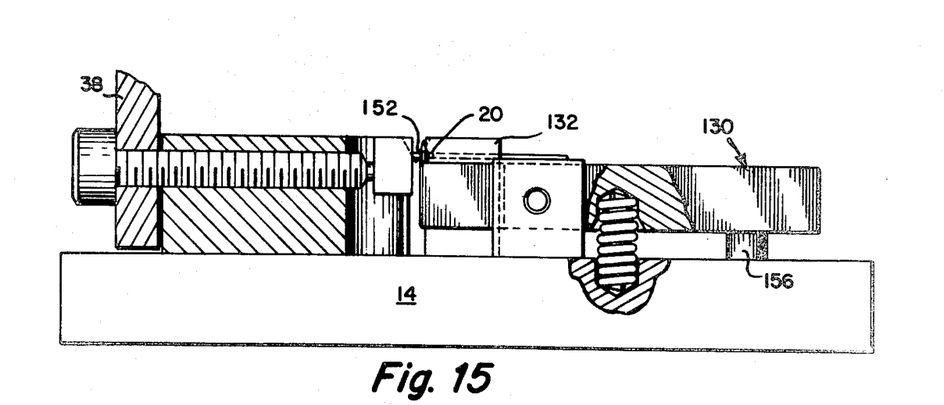
FIG. 15 is a side and cross-sectional view of the optical fiber cleaving tool of FIG. 14 illustrating the lever in its fully actuated position.

The actuated position of lever 130 is illustrated in FIG. 15 where it can be seen that the fiber is pulled about anvil 132 by virtue of the contacting of this fiber by straight portions 152 of the pins. The action provided by the pins can be more readily seen in FIG. 16 in which portions 160 of the fiber lie in a plane designated by dotted line 170 which is parallel to a line 172 which passes through a point 174 immediately beneath scribe line 176. Note that line 172 is tangent to surface 134 at point 174. In order to achieve the appropriate tangency, it is important that scribe 24 be located along an axis 180 on which center of curvature 182 lies.

Figure 16:
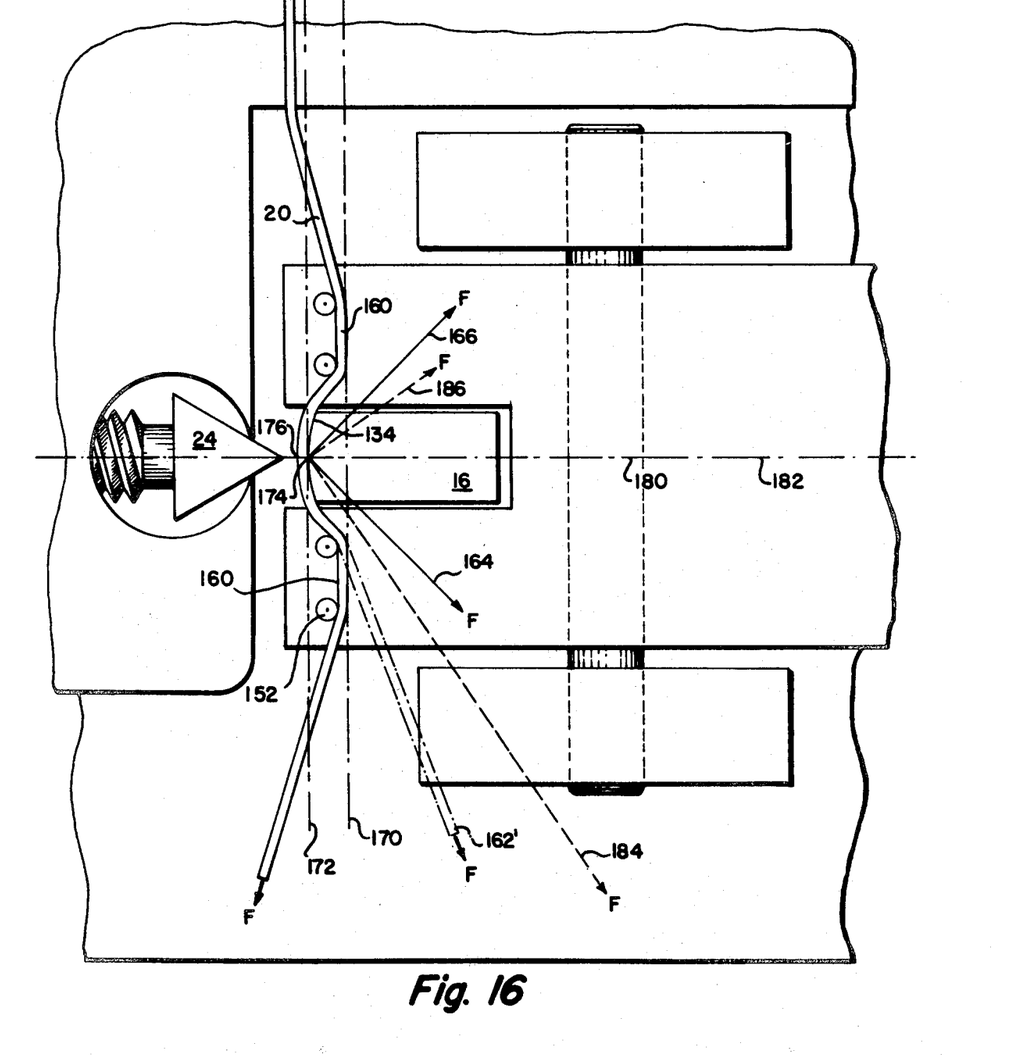
FIG. 16 is a diagrammatic illustration of the position of the fiber during cleaving against the anvil showing balanced forces at the scribe line.

Should free end 162 of the fiber be pulled in the direction illustrated at 162', an unbalanced set of force vectors 184 and 186 will result, which at the very least will result in the plane of the end of the cleaved fiber being oblique to its correct position normal to the longitudinal axis of the optical fiber.

Figure 17A:
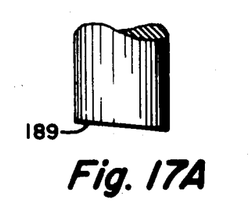
FIGS. 17A, 17B and 17C illustrate improperly cleaved fiber ends respectively obliquely cleaved, having a lip and having a breakaway.
Figure 17B:
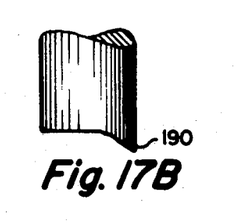
Figure 17C:
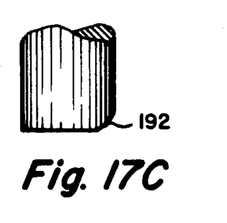

As illustrated in FIG. 17A, an obliquely cleaved fiber as illustrated at 189 will be the result of unbalanced forces. Additionally, should unbalanced forces exist, either a lip will be formed as illustrated in FIG. 17B at 190 or, as illustrated in FIG. 17C, a breakaway 192 will be formed.

While the foregoing describes the pressing of a fiber to the anvil by means of pins, it will be appreciated that the pins may be tapered throughout, with the stop on the lever providing for the positioning of the fiber. Moreover, flat pieces may be substituted for the pins as long as the flat faces of the pieces which contact the fiber are parallel to the aforementioned tangent. These flat faces may be tapered if mounted on bifurcated legs of the lever, or need not be tapered if some other means is utilized to move these flat pieces into contact with the fiber. For instance, the flat pieces may be mounted on a base which is plunger-actuated so as to translate the pieces into contact with the fiber. Alternative actuation methods are also within the scope of this invention.

Having indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A cleaving tool for separating an optical fiber comprising:
 a base;
 an optical fiber retaining block mounted on said base and having a groove adapted to receive an optical fiber, said block having an end with which said groove communicates;
 stationary scribe means mounted on said base and positioned adjacent said end to one side of the centerline of said groove; and
 outwardly curved anvil means mounted on said base and positioned to the other side of said centerline diametrically opposite said scribe means,
 whereby
 a fiber may be cleaved by first moving said fiber against said stationary scribe means and then pressing the scribed fiber against said anvil means such that a portion of said fiber conforms to the shape of said curved anvil means and such that the fiber portions to either side of said anvil means are maintained parallel to said centerline in a vertical plane.

2. The cleaving tool of claim 1 and further including pressing means including a pair of spaced members to either side of said anvil means.

3. The cleaving tool of claim 2, whereby said pressing means includes four spaced pins, each having a tapered upper portion and a straight lower portion and means for mounting said pins such that pairs of pins are positioned to either side of said anvil means and such that said pins are moveable as a group from beneath the position of a fiber lying on said centerline to a position at which said fiber is initially engaged by said tapered portions and finally engaged by said straight portions.

4. The cleaving tool of claim 3 wherein the tapered portions of said pins are conical and wherein said straight portions are cylindrical.

5. The cleaving tool of claim 3 wherein said pin mounting means is lever actuated and includes a bifurcated lever having respective pairs of pins on each bifurcated portion, and means for pivotally attaching said lever to said base such that the top of the tapered portions engage said fiber to the side away from said anvil means when said lever is rotated around its pivot point.

6. The cleaving tool of claim 2 wherein said pressing means includes means for moving said spaced members into engagement with said scribed fiber.

7. The cleaving tool of claim 6 wherein said members are tapered and wherein said moving means includes a bifurcated lever having respective tapered members on respective bifurcated portions and means for pivotally attaching said lever to said base such that the top of said tapered members engage said fiber to the side away from said means when said lever is rotated about its pivot point.

* * * * *

UNITED STATES PATENT AND TRADEMARK OFFICE
CERTIFICATE OF CORRECTION

PATENT NO. : 4,463,886
DATED : August 7, 1984
INVENTOR(S) : Leif N. Thornton

It is certified that error appears in the above-identified patent and that said Letters Patent is hereby corrected as shown below:

Column 1, line 8, "or stands." should read -- or strands. --.

Column 6, line 6, "a lipor" should read -- a lip or --.

Column 8, line 34, "whereby said" should read -- wherein said --.

Column 8, line 63, "said means" should read -- said anvil means --.

Signed and Sealed this

Seventh Day of May 1985

[SEAL]

Attest:

DONALD J. QUIGG

Attesting Officer     Acting Commissioner of Patents and Trademarks